United States Patent
Buehler et al.

(10) Patent No.: US 9,628,492 B2
(45) Date of Patent: Apr. 18, 2017

(54) METHOD AND SYSTEM FOR RESTRICTING ACCESS RIGHTS ON USER PROFILE INFORMATION USING A NEW NOTION OF PEER

(75) Inventors: Dieter Buehler, Tuebingen (DE); Charles P. de Saint-Aignan, Providence, RI (US); Stefan Hepper, Holzgerlingen (DE); Stefan Schmitt, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 2207 days.

(21) Appl. No.: 12/365,440

(22) Filed: Feb. 4, 2009

(65) Prior Publication Data
US 2009/0198682 A1   Aug. 6, 2009

(30) Foreign Application Priority Data
Feb. 5, 2008 (EP) .................................. 08151050

(51) Int. Cl.
*G06F 17/30* (2006.01)
*H04L 29/06* (2006.01)

(52) U.S. Cl.
CPC ...... *H04L 63/102* (2013.01); *G06F 17/30589* (2013.01); *G06F 17/30699* (2013.01); *H04L 63/104* (2013.01)

(58) Field of Classification Search
CPC ......... G06F 17/30589; G06F 17/30699; G06F 21/6245
USPC ................................................. 707/783, 784
See application file for complete search history.

(56) References Cited

U.S. PATENT DOCUMENTS

| | | | |
|---|---|---|---|
| 2002/0129135 A1 | 9/2002 | Delany et al. | |
| 2003/0200465 A1* | 10/2003 | Bhat et al. | 713/202 |
| 2004/0034799 A1 | 2/2004 | Mikami | |
| 2004/0107139 A1 | 6/2004 | Shibanuma | |
| 2005/0022006 A1* | 1/2005 | Bass et al. | 713/201 |
| 2007/0162547 A1* | 7/2007 | Ross | 709/204 |

* cited by examiner

*Primary Examiner* — William Spieler
(74) *Attorney, Agent, or Firm* — Steven M. Greenberg, Esq.; CRGO Law

(57) ABSTRACT

The present invention relates to the field of Network portals and in particular to a method and system for restricting access rights on user profile information using a new notion of peer groups, wherein a given user's peer group is defined to be the set of users containing all the members of all the user's communities, wherein the individual communities are defined within the web portal wherein on said web portal a plurality of composite applications are implemented, wherein each composite application (19; 50) has a predetermined number of users working with said composite application building a community for that composite application,
characterized by the steps of:
  a) building a filter based on the peer group of the requesting user by collecting the communities of all composite applications which said user is member of (650, 660, 670)
  b) using said filter as an additional constraint when selecting (680) user information from the user registry in order to limit all query results to user profile information associated to members of the given user's peer group and,
  c) displaying the result to the user (690).

6 Claims, 7 Drawing Sheets

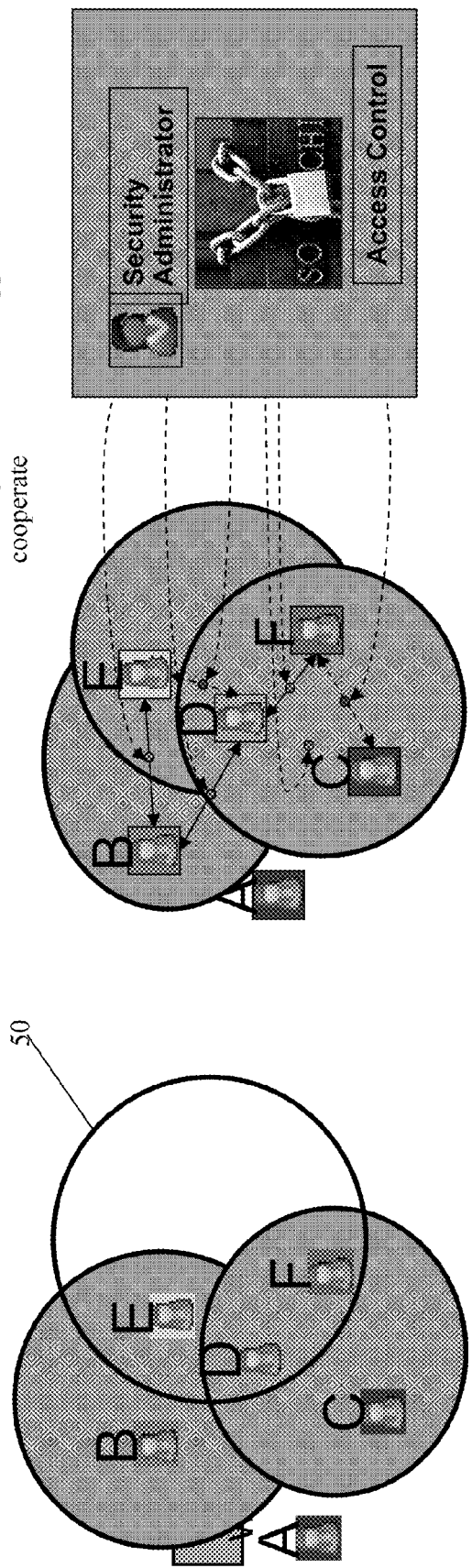

- Users are collaborating in communities of composite applications
  - 3 composite applications, 3 communities
- Users can be part of multiple communities

FIG. 5A

PRIOR ART user visibility
- User awareness is controlled by access control
- Access control is maintained by a security administrator
- User D may not be allowed to see user E although D and E are supposed to cooperate

FIG. 5B

PRIOR ART

METHOD AND SYSTEM FOR RESTRICTING ACCESS RIGHTS ON USER PROFILE INFORMATION USING A NEW NOTION OF PEER

CROSS-REFERENCE TO RELATED APPLICATIONS

This application claims priority under 35 U.S.C. §119(a) to European Patent Application Serial Number EP08151050.5, filed Feb. 5, 2008, entitled "METHOD AND SYSTEM FOR RESTRICTING ACCESS RIGHTS ON USER PROFILE INFORMATION USING A NEW NOTION OF PEER", the entirety of which is incorporated herein by reference.

BACKGROUND OF THE INVENTION

Field of the Invention

The present invention relates to the field of Network portals and in particular to a method and system for restricting access rights on user profile information using a new notion of peer groups.

Description and Disadvantage of Prior Art

In this field the term "composite application" defines an application hosted on a web portal platform which is built by combining and connecting multiple components such as portlets, wikis, document libraries and web services, for a particular purpose such as a shop or a virtual team room application. A single portal platform may host multiple instances of the same composite application, for example different team rooms for different associated user communities. Composite applications are built from a template describing the contained components and their set-up and interconnection.

FIG. 1 shows the overview of the components that build up the prior art application infrastructure 11—abbreviated herein also as AI—system architecture within an overall portal system 10. The application infrastructure comprises:

the templating application infrastructure 13—abbreviated herein also as TAI—that handles the templates in the system and the creation of new composite applications, the composite application infrastructure 15—abbreviated herein also as CAI—that handles the application instances 19 during runtime and manages connections and the data flow between the components of an application, the component registry 27 that manages the business components installed in the system, and the portal handler 29 which is a specific local component that manages any portal related artifacts 8 like pages or portlets for the application infrastructure in the portal, and which is used by the instantiation component 17 to create such artifacts during the creation of a new composite application.

The templating application infrastructure (TAI) component 13 manages the templates 23 in the system which contain references to instantiable components in a local list of components 27. As an example, a template for shopping applications could consist of a reference to a document library component which is used to hold the available goods and their descriptions, a shop portlet that let clients process actual shopping transactions, an invoice business component that handles the payment process and a blogging component that allows clients to comment on their satisfaction.

The TAI component 13 also creates application instances from the templates via an instantiation component 17, which creates separate instances of the referenced business components, typically by creating or copying individual configurations for these components such that multiple application instances can be created from the same template without interfering with each other.

For the above mentioned sample template, the instantiation 17 would, among other things, create an individual storage compartment in the document library, an individual configuration of the invoice component referring to the bank account and an individual configuration for the shop portlet that is set up to display goods from the created document library and to delegate payment processing to the created invoice component instance.

In particular, the instantiation 17 needs to create the necessary portal artifacts like pages that allow to interact with the created composite application, which is typically done by employing a specific handler 29 that creates those portal artifacts 8 and links them with the business components of the application.

The created composite application instances 19 hold a context 25 that lists the component instances that make up the composite application FIG. 2 shows an overview of the storage components involved in the portal architecture 10 that comprises deployment related code in a deployment component 14 and a runtime environment in one or more runtime containers 12 where the deployed components are executed.

For the composite application context deployed artifacts are:

application components stored in a component registry 18, templates stored in a template catalog 20.

This data is then referenced by the application's instance specific data 16.

With reference now to the focus of the invention, prior art composite applications are a key concept of prior art Service Oriented Architecture. They allow end-users to assemble business logic out of a set of given components without programming by simply defining some meta information, such as configuration data and application structure.

Prior art composite applications are supported for example by the prior art IBM WebSphere Portal and other known products.

With reference now to FIG. 3, 4, 5A 5B, and with respect to the very technical problem of the current invention, prior art web-based collaboration platforms typically support the concept of "communities". A community 50 (e.g., circle 50 in FIG. 5A) is a set of people—e.g. persons D, E F, that share a specific working objective or interest. Being member of a given community typically comes with access to resources or portal objects 8 (FIG. 1) shared within the community such as documents, portal pages, and portlets 32, in order to be able to collaborate together in one or more composite applications. Other communities 51 and 52 coexist with similar function and persons contained therein.

Communities in prior art are created and managed in a dynamic on-demand fashion with the creator of a community being the community manager that is allowed to invite other people to the community. This disadvantageously includes much manual work.

With particular reference to FIG. 3, in prior art collaboration platforms, access control on user data is typically managed by a logical program component 36 in a way orthogonal to the community concept. This means, a security administrator defines by way of a logical User Management program component 34, which user is allowed to see profile information of what other users. Based on this access control information, users can benefit from people awareness features, like "who is online right now . . . ". Details thereto are explained with reference to FIG. 4.

With particular reference to FIG. 4 illustrating prior art access management to users for a certain given single user, when this single user initiates a search on an other user, see step 1 in FIG. 4, this user uses a respective user interface for such search request which is provided by some portlet 41 to him. This portlet 41 passes his request to the user management component 34, which intern provides the access to a user data store and a group data store, see step 2.

Then in a further step 3 an interaction step between component 34 and access control component 36 is performed during which it is checked if the before mentioned user "Bob" is allowed to see other users. The respective control information is managed by the access control component 36 which stores and manages access information on all types of resources, and so also of the resource "user".

In order to do that the access control component 36 looks up the access rights for user Bob in its current configuration, see step 4.

In order to do that completely, also the static access information from database 39 is looked up by observing the entry for user Bob. The result is returned to the user management component 34 which evaluates this result and sends the search request to a backend storage device 38, for example the LDAP user store in order to perform search overall available users.

Further disadvantageously, and with respect to step 5 in FIG. 4, there is no dynamic method available to allow an "admin" user concerned with security management tasks, to restrict the available user base of a given user to the persons he has a need to collaborate to. If something like this is required the admin will need to manage the access rights for every user, if a membership of a community has changed, which results in a high personal manual effort of the admin.

Further, prior art collaboration tools only allow each user to search all users from the available directory. This is of great disadvantage however, as in many situations the full list of users—e.g.—several hundred or several thousands of them is simply too large to be scrolled and controlled by an individual.

Thus, the desire results that a name is able to be made invisible for others. The only way to be "invisible" for other users, however, is by either using a black or a white list. Those lists, however, need to be maintained by each individual user, however, which again results in a high personal manual effort.

Objectives of the Invention

The objective of the present invention is thus to provide a more efficient and flexible method and system for restricting access rights on user profile information.

SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the broadest aspect of the inventional method a method for restricting access rights on user profile information using a new notion of peer groups, wherein a given user's peer group is defined to be the set of users containing all the members of all the user's communities, wherein the individual communities are defined within the web portal wherein on said web portal a plurality of composite applications are implemented, wherein each composite application (19; 50) has a predetermined number of users working with said composite application building a community for that composite application, characterized by the steps of:

a) building a filter based on the peer group of the requesting user by collecting the communities of all composite applications which said user is member of (650, 660, 670)

b) using said filter as an additional constraint when selecting (680) user information from the user registry in order to limit all query results to user profile information associated to members of the given user's peer group and, c) displaying the result to the user (690).

Further, for the executing step b) instead of a LDAP filter, an explicit post filter step is implemented in order to discard all user profile information from the query result that is not associated to users contained in the requesting users peer group.

As to the advantages:

The inventional method provides an automatic visibility control for users based on community membership wherein users are automatically allowed to see, i.e. be aware of, the other community members.

By way of the inventional method it is advantageously possible to limit the set of visible users to exactly those users that are collaborating with each other—e.g. the members of a shared community.

Further advantageously, the inventional method provides to automatically assess the relevance of individual communities for individual users.

The present invention is based on the idea to introduce "peer groups" wherein a peer group is related to a given user and is the set of users that share at least one community membership with the given user. The membership to a certain community is defined preferably by the membership to the same composite application or, in other terms to the same collaborative application.

Further, according to this guideline access control to the before mentioned resources of a web portal is based according to the invention on the above mentioned peer groups. So, the inventional method and system support a specific operational mode in which the access control valid for a given user is solely controlled by his membership to the respective composite or collaborative application. By that a user is allowed to be aware of the existence of another user and may access the user profile of such user only if this user is a part of his peer group.

BRIEF DESCRIPTION OF THE DRAWINGS

The present invention is illustrated by way of example and is not limited by the shape of the figures of the drawings in which:

FIG. 5a illustrates prior art user collaboration in different communities in a portal environment according to FIG. 3;

FIG. 5b illustrates the user visibility for the collaborating users of FIG. 5a (also prior art);

DETAILED DESCRIPTION OF THE PREFERRED EMBODIMENT

Figure 1:
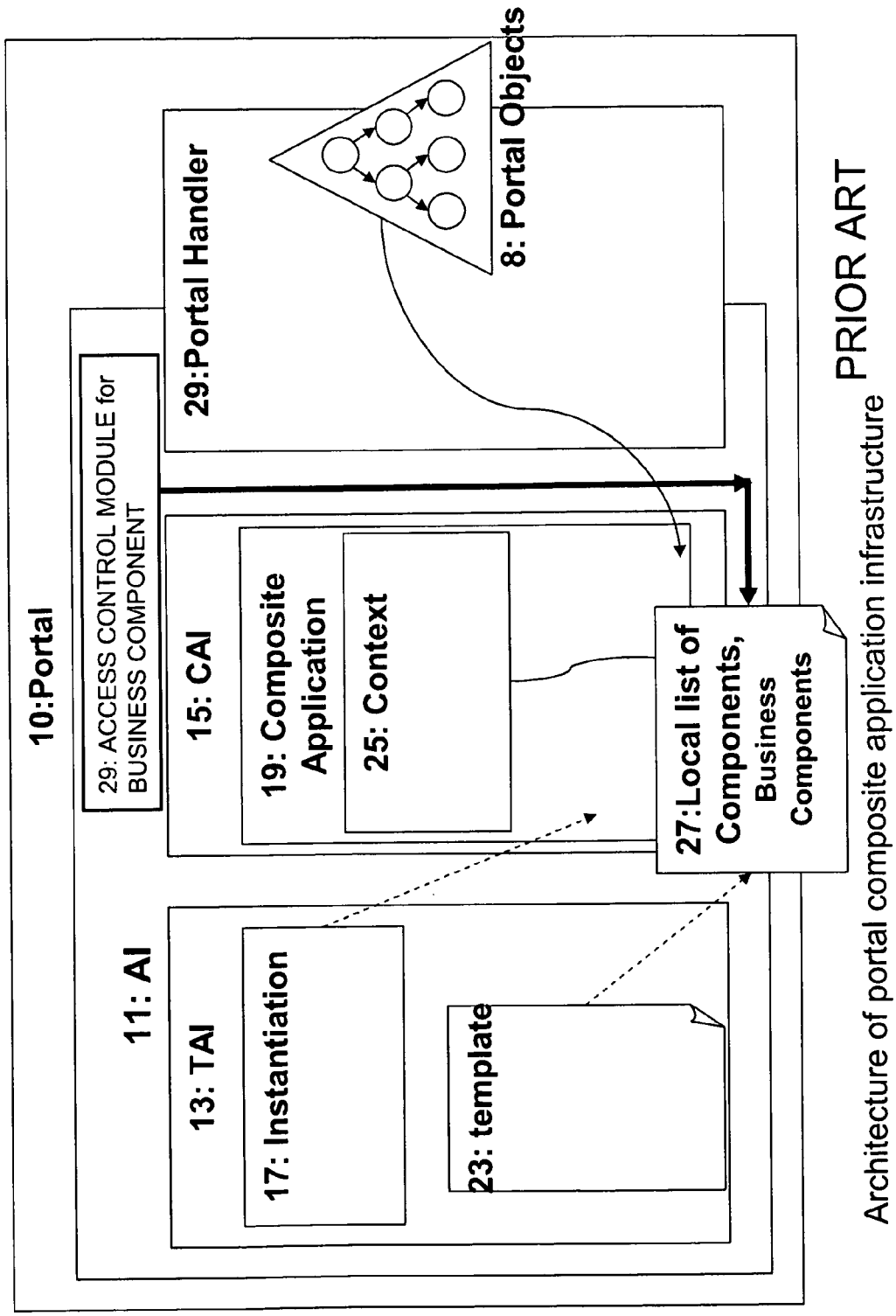
FIGS. 1 and 2 illustrate the most basic structural components of a prior art hardware and software environment used for a prior art method at a portal site.
Figure 2:
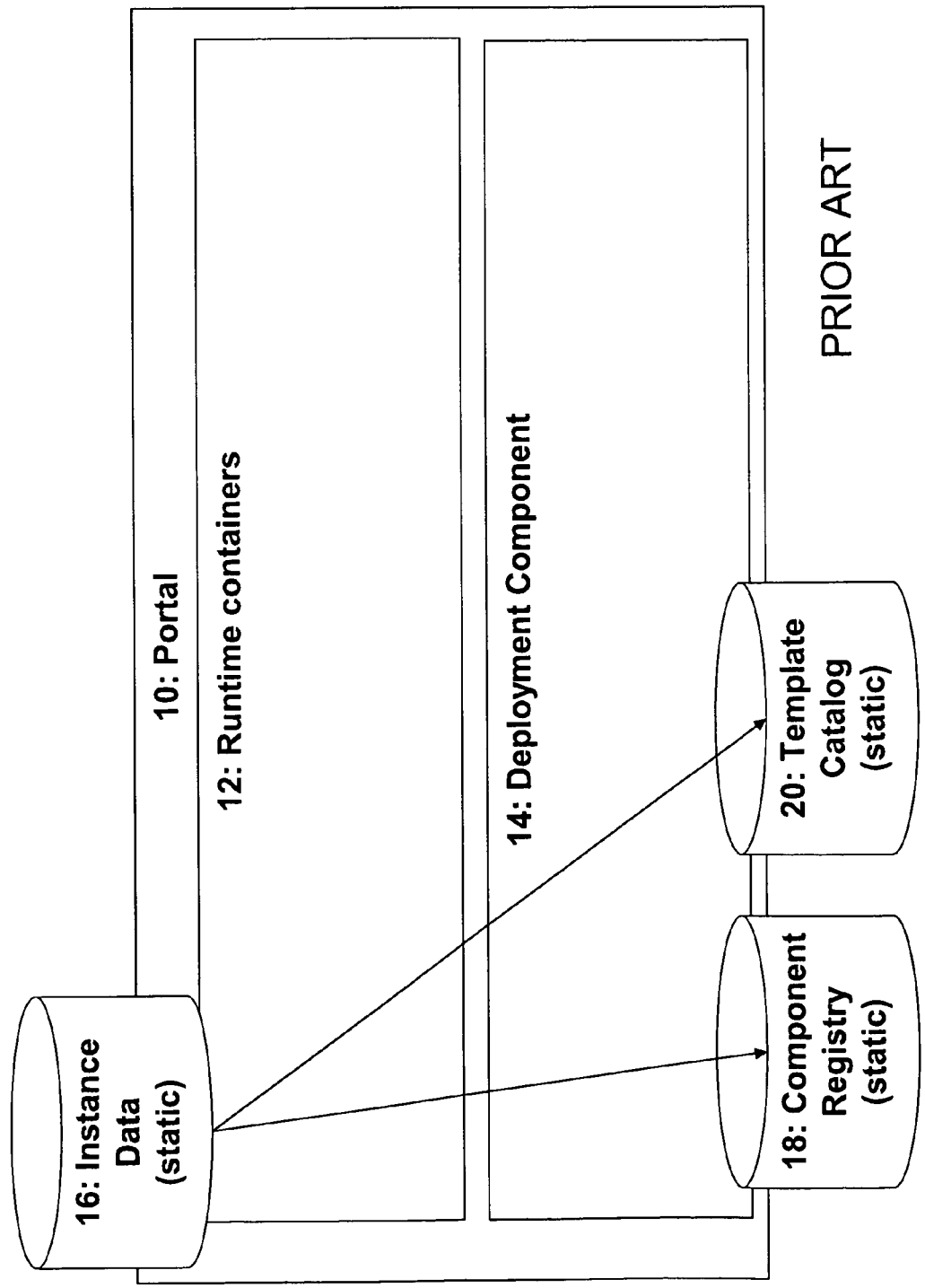
Figure 3:
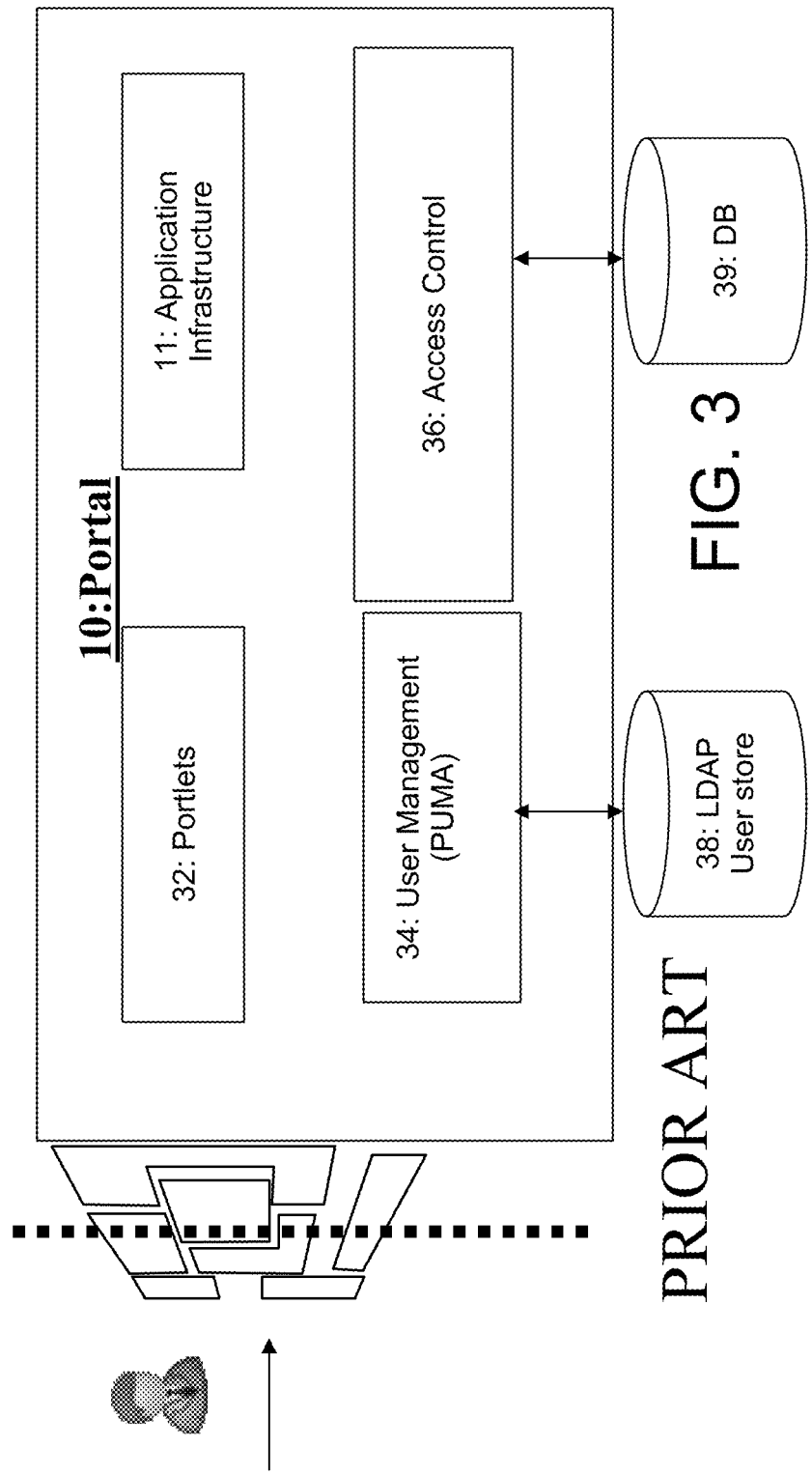
FIG. 3 illustrates the structural components relevant specifically for management of access control rights in a prior art hardware and software environment used for a prior art method at a portal site.
Figure 4:
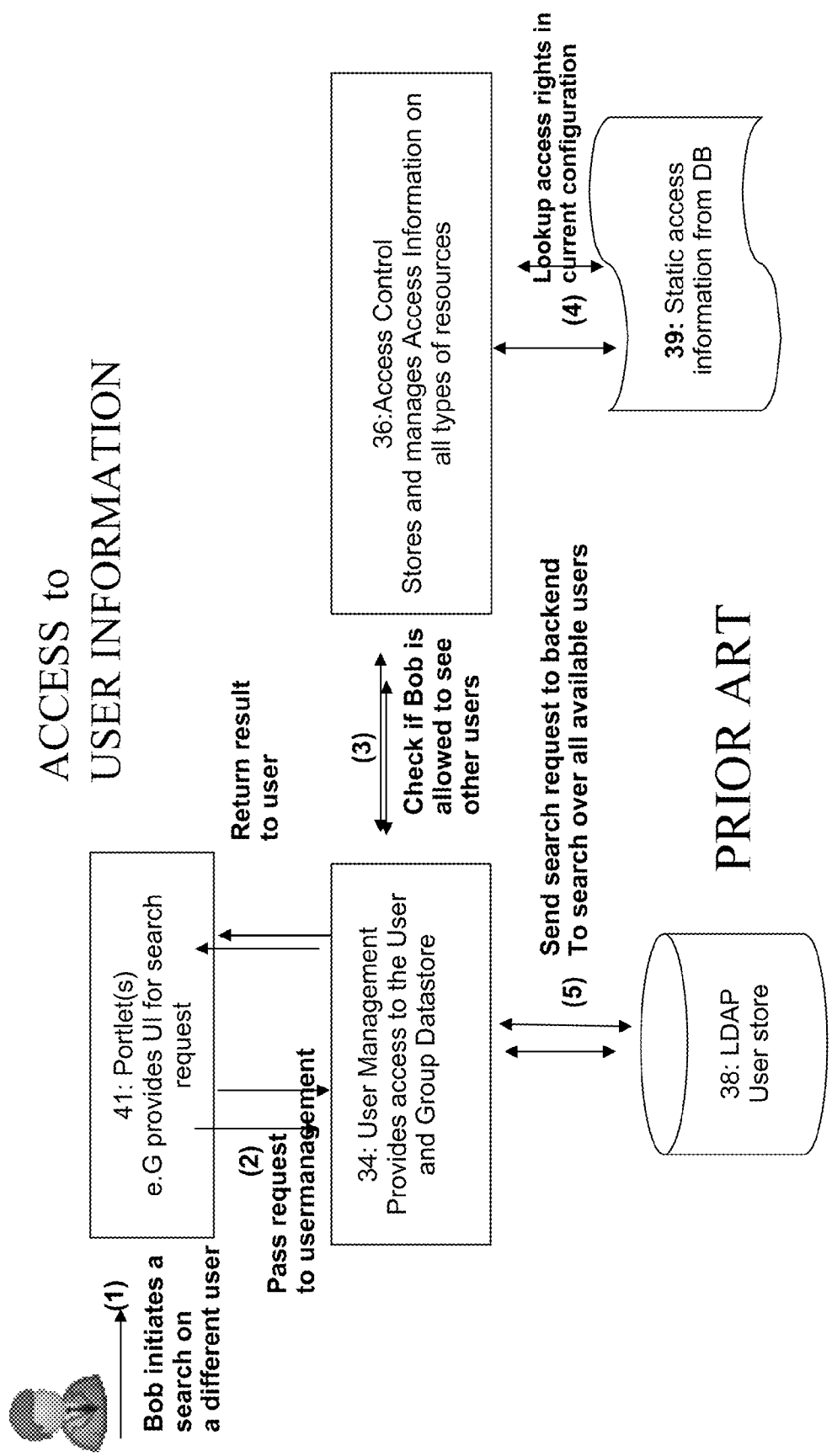
FIG. 4 is a schematically block diagram illustrating the access and management of user information in the prior art hardware and software environment of FIG. 3, used by a prior art access method.
Figure 6:
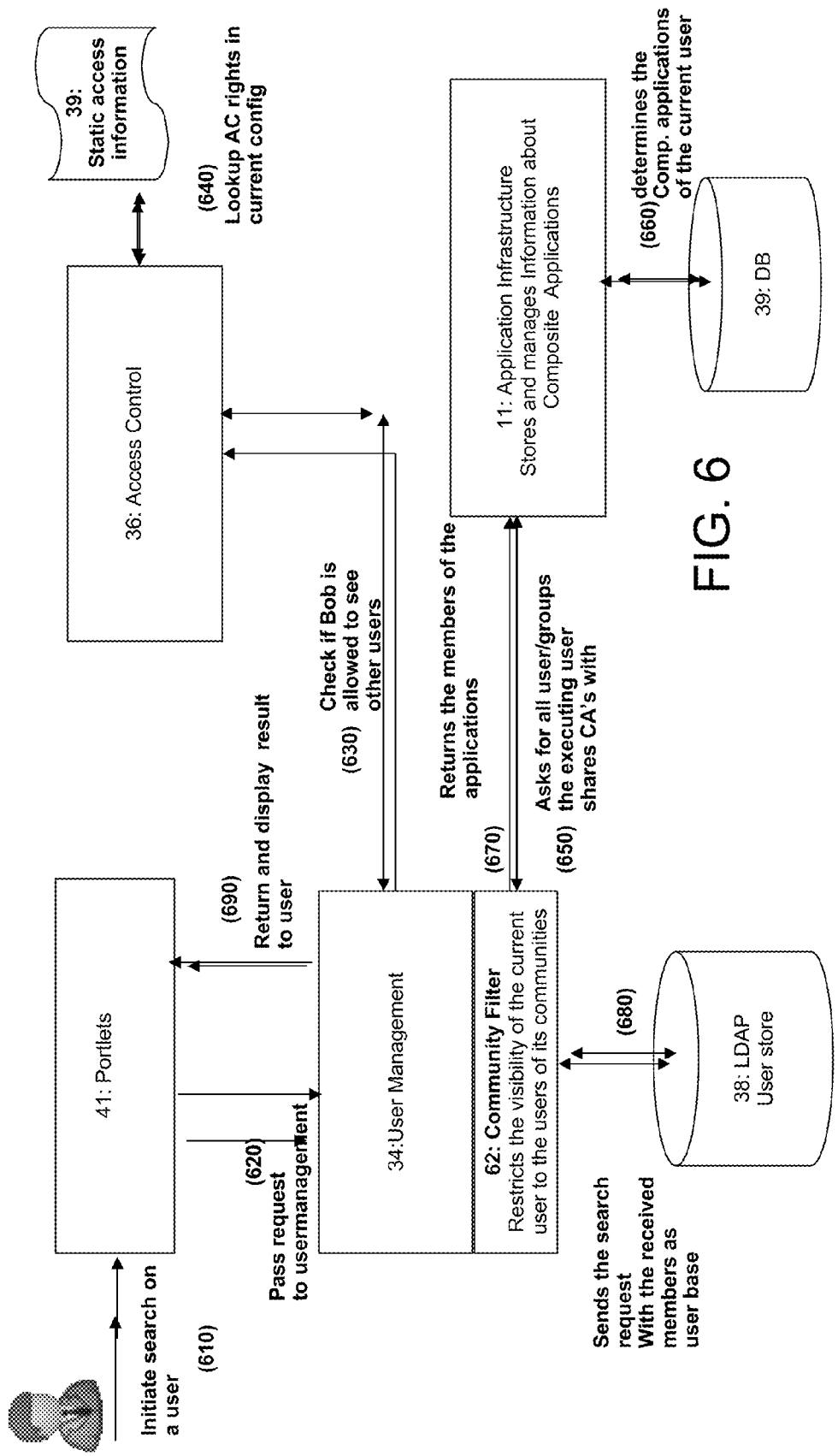
FIG. 6 is a depiction according to FIG. 4 enriched by the inventional components of the inventional method according to a preferred embodiment thereof including the interaction control steps performed during the inventional method.

With general reference to the figures and with special reference now to FIG. 6, when running a program implementing a preferred embodiment of the inventional method in a portal environment the access to user information for a single user Bob is described as follows:

The first steps 1, 2, 3 and 4 are performed as described above with the discussion of prior art. They are denoted in FIG. 6 with reference numbers 610 to 640, respectively. This ends up with the result, if Bob is allowed to see other users, which result is made available to the user management component 34.

Then, in a novel step 650 a community filter component 62 provided by this inventional embodiment implements a restriction of the visibility of the current users to the subset of users of Bob's communities. In order to do that the inventional community filter 62 sends an ask request for all users and groups the exemplary user Bob is sharing a composite application with. This request is directed to the application infrastructure 11, which is known from prior art and stores and manages information about composite applications implemented in the portal. This program component 11 first determines all composite applications the exemplary user Bob is member of. This information is based upon the composite application Bob is able to join and the users, or groups which are listed as members of those composite applications. The application infrastructure component 11 retrieves this information from the Datastore 39, see step 660. The application component 11 returns this information to the user management component 34, see step 670.

Now the user management component uses the plurality of user names representing the members of the plurality of Bob's composite applications in order to establish a filter criterion, which is generated by the inventional, enriched user management component 34. So, as a result of this evaluation a search request is generated by user management component 34 in cooperation with the community filter component 62 which includes the composite applications and the respective restricted members thereof corresponding to Bob's composite applications.

This generated search request is then sent by the community filter 62 of the user management component 34 to the backend user data store 38 in order to get the user information of the restricted plurality of users instead of all users as done in prior art.

Next, an example for information returned in step 670 is given as follows:
Returns list of Distinguished names
{uid=bob,o=yourco:uid=alice,o=yourco:cn=allmanagers, o=yourco}

Further, an example for a filtered request against the LDAP store 38 is given in pseudo code as follows:
find all users from LDAP where displayname='bo*' and distinguishednames in
{uid=bob,o=yourco:uid=alice,o=yourco:cn=allmanagers, o=yourco}

The effect of the inventional method is a restricted user visibility for any exemplary user, such as user Bob in the forgoing description. By means of the inventional method special peer groups are established, wherein the users of the portal are now implicit members of their individual peer groups.

Figure 7:
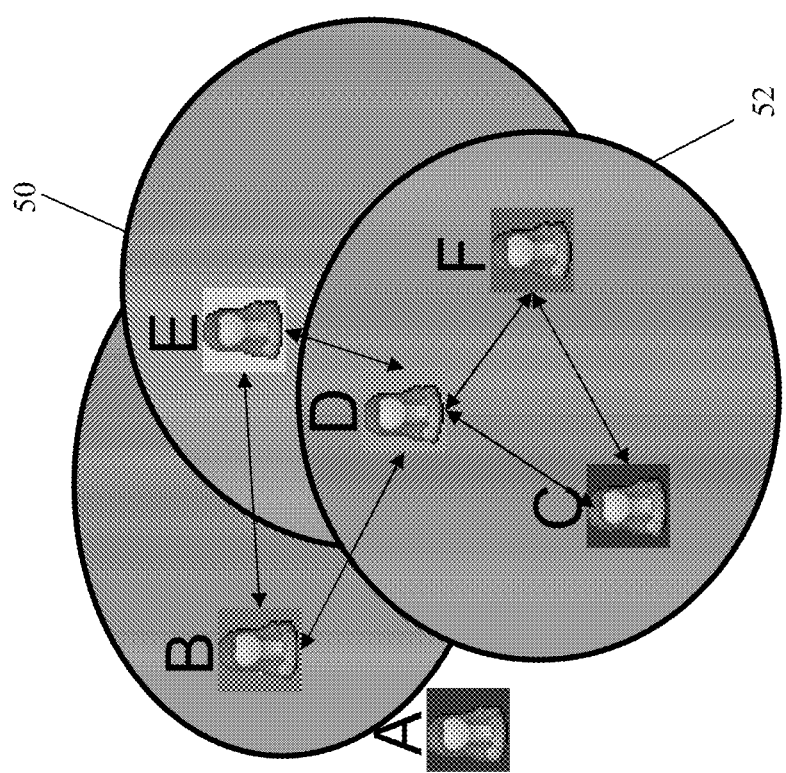
FIG. 7 is a depiction of user visibility when the inventional method is applied.

With reference to FIG. 7 the peer group of user E is the set of persons B, D, F. Further, the peer group of person A is an empty set. The peer group of user B are persons D, E, the peer group of person C are persons D, F, and the peer group of person D are persons C, F, B, E.

Due to the inventional method all users are automatically allowed to communicate with the persons of their individual peer groups without being constrained to perform a difficult user selection from the set of all users having access to the portal. By that, the user comfort is significantly increased because the communication is significantly simplified because the selection, to which user a communication shall be established, is significantly simplified. So, automatically any exemplary user only sees communication partners of composite applications in which he is member and thus he is collaborating with.

As reveals also from FIG. 7, for example for user C, this user is not aware of user E, since user E and user C have no shared composite application. Remark that each circle in FIG. 7 corresponds to a composite application and a position for person within circle symbolizes the membership of that person in that composite application.

Further advantageously, FIG. 7 illustrates that in case a new user A joins the community 52 she will automatically see the users C, D and F, as they are also members of composite application 52. The inventional method may also include an additional access control step which may be applied on top of the access control performed by the inventional method in its base form as it was described above. This can be preferably done in particular situations, for example when a person has to provide some administration and is thus provided with quite high access rights, but still does not have access rights to the whole, entire plurality of users of a portal. This may be of great advantage, for example in situations, in which a merger of two enterprises is performed, wherein two preexisting portals are merged and wherein the user management and portal management is determined to be continued quite individually for each of the merged enterprises. In addition, it is still possible to provide some users the right to see more users as defined through their peer group. This is for the purpose to send an invitation to a new user who does not belong to any community.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for restricting access rights on user profile information using peer groups, wherein a given peer group of a user includes a set of users in all communities of which the user is a member, wherein each of the communities is defined within a web portal upon which a plurality of composite applications are implemented, each of the composite applications comprising a predetermined number of users building a corresponding community, the method comprising the steps of:
   a. receiving a query from a requesting user for a user registry, identifying a peer group of the requesting user and building a filter based upon the peer group of the requesting user by including in the filter each of the communities of all composite applications of which said requesting user is a member;
   b. querying the user registry for user information with a primary constraint and also with an additional constraint of the filter in order to limit all results of the query to user profile information associated with members of the communities of all composite applications of which said requesting user is a member; and,
   c. displaying the result to the requesting user.

2. The method according to claim 1, further comprising explicitly post filtering the results instead of lightweight directory access protocol (LDAP) filtering the results in order to discard all user profile information from the query results that are not associated with members of the identified peer group.

3. The method according to claim 1, wherein a ranking between said composite applications is implemented in order to establish an inner hierarchical structure of user names to be displayed in the result.

4. The method according to claim 1, wherein for a user having defined some community characterizing information, some meta data corresponding to each of said composite applications are evaluated, and a relevance of at least one of said composite applications for the community characterizing information is evaluated, and is displayed to said requesting user.

5. An electronic data processing system for restricting access rights on user profile information using a new notion of peer groups, wherein a given user's peer group is defined to be the set of users containing all the members of all the user's communities, wherein the individual communities are defined within the web portal wherein on said web portal a plurality of composite applications are implemented, wherein each composite application has a predetermined number of users working with said composite application building a community for that composite application, said system comprising:
   memory, storage and at least one processor; and,
   a community filter component comprising program code that when executes by the at least one processor, performs the steps of:
   a. receiving a query from a requesting user for a user registry, identifying a peer group of the requesting user and building a filter based upon the peer group of the requesting user by including in the filter each of the communities of all composite applications of which said requesting user is a member;
   b. querying the user registry for user information with a primary constraint and also with an additional constraint of the filter in order to limit all results of the query to user profile information associated with members of the communities of all composite applications of which said requesting user is a member; and,
   c. displaying the result to the requesting user.

6. A computer program product restricting access rights on user profile information using peer groups, wherein a given peer group of a user includes a set of users in all communities of which the user is a member, wherein each of the communities is defined within a web portal upon which a plurality of composite applications are implemented, each of the composite applications comprising a predetermined number of users building a corresponding community, comprising a computer useable storage memory device storing a computer readable program, wherein the computer readable program includes a functional component that when executed on a computer causes the computer to perform the steps of:
   a. receiving a query from a requesting user for a user registry, identifying a peer group of the requesting user and building a filter based upon the peer group of the requesting user by including in the filter each of the communities of all composite applications of which said requesting user is a member;
   b. querying the user registry for user information with a primary constraint and also with an additional constraint of the filter in order to limit all results of the query to user profile information associated with members of the communities of all composite applications of which said requesting user is a member; and,
   c. displaying the result to the requesting user.

* * * * *